United States Patent [19]
Ploix et al.

[11] Patent Number: 4,807,270
[45] Date of Patent: Feb. 21, 1989

[54] RADIOLOGICAL SCANNING APPARATUS

[75] Inventors: Jean L. Ploix, Issy Les Moulineaux; Jacques Trotel, Palaiseau, both of France

[73] Assignee: Thomson-CSF, Paris, France

[21] Appl. No.: 920,441

[22] Filed: Oct. 20, 1986

[30] Foreign Application Priority Data

Oct. 22, 1985 [FR] France .................. 85 15665

[51] Int. Cl.⁴ .............................................. G21K 5/10
[52] U.S. Cl. .................... 378/146; 378/167; 378/171
[58] Field of Search ........... 378/41, 146, 167, 171, 378/175, 181

[56] References Cited

U.S. PATENT DOCUMENTS

| | | | |
|---|---|---|---|
| 2,006,914 | 7/1935 | Fayolle | 378/171 |
| 3,536,913 | 10/1970 | Huchel | 378/40 |
| 3,783,282 | 1/1974 | Hoppenstein | 378/41 |
| 3,832,546 | 8/1974 | Morsell et al. | 378/146 |
| 4,104,519 | 8/1978 | Oldendorf | 378/146 |

FOREIGN PATENT DOCUMENTS 1448176 6/1966 France .
2188862 1/1974 France .
2453408 10/1980 France .
0001124 4/1982 PCT Int'l Appl. .

Primary Examiner—Carolyn E. Fields
Assistant Examiner—John C. Freeman
Attorney, Agent, or Firm—Oblon, Fisher, Spivak, McClelland, & Maier

[57] ABSTRACT

A radiological scanning apparatus for forming an image of an object on a film by scanning said object with a flat fan shaped beam. The film is conformed so as to form a surface of revolution. The surface of revolution is, on the one hand, moved in the same movement as the scanning movement of said beam, and on the other hand it is rotated about its axis of revolution so as to renew a surface exposed to said beam in order to reduce the dimension of said film considered in the direction of said scanning movement.

8 Claims, 2 Drawing Sheets

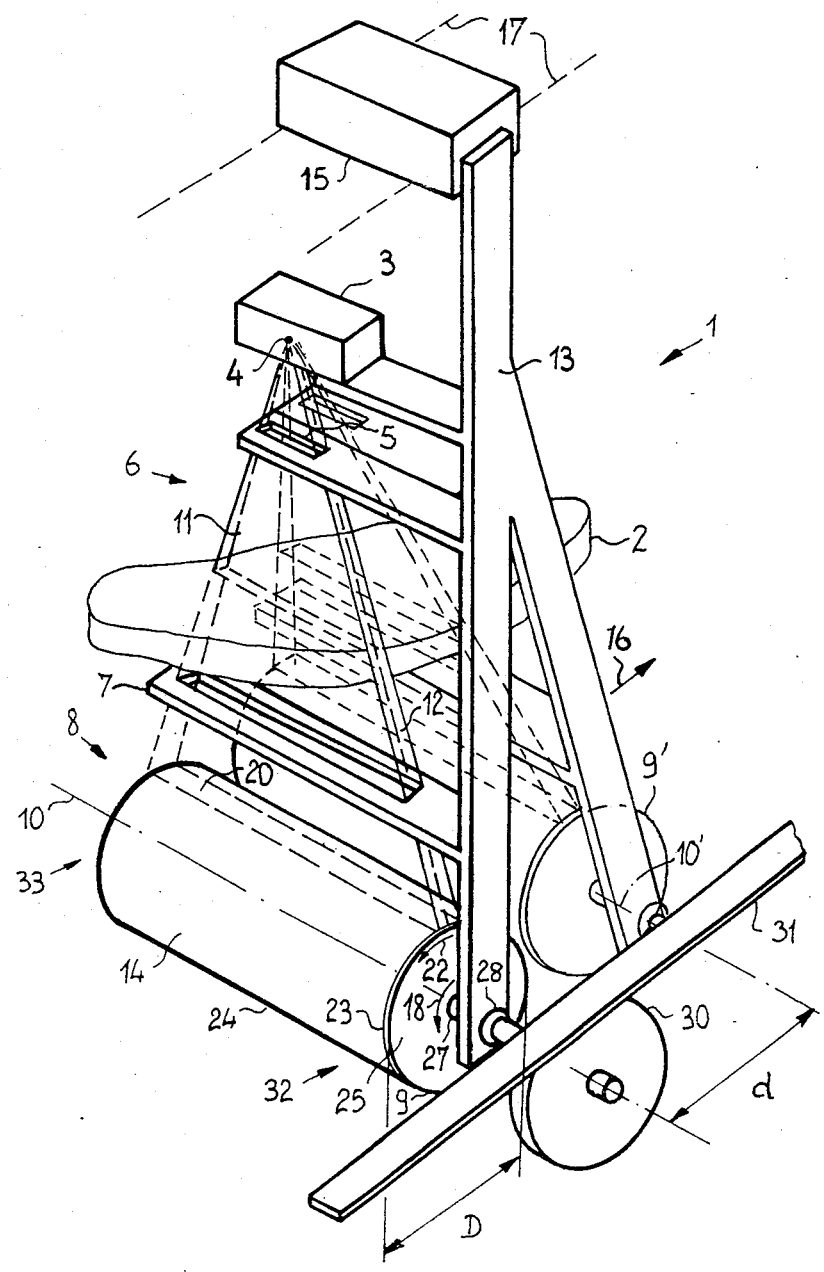
FIG_1

FIG_2
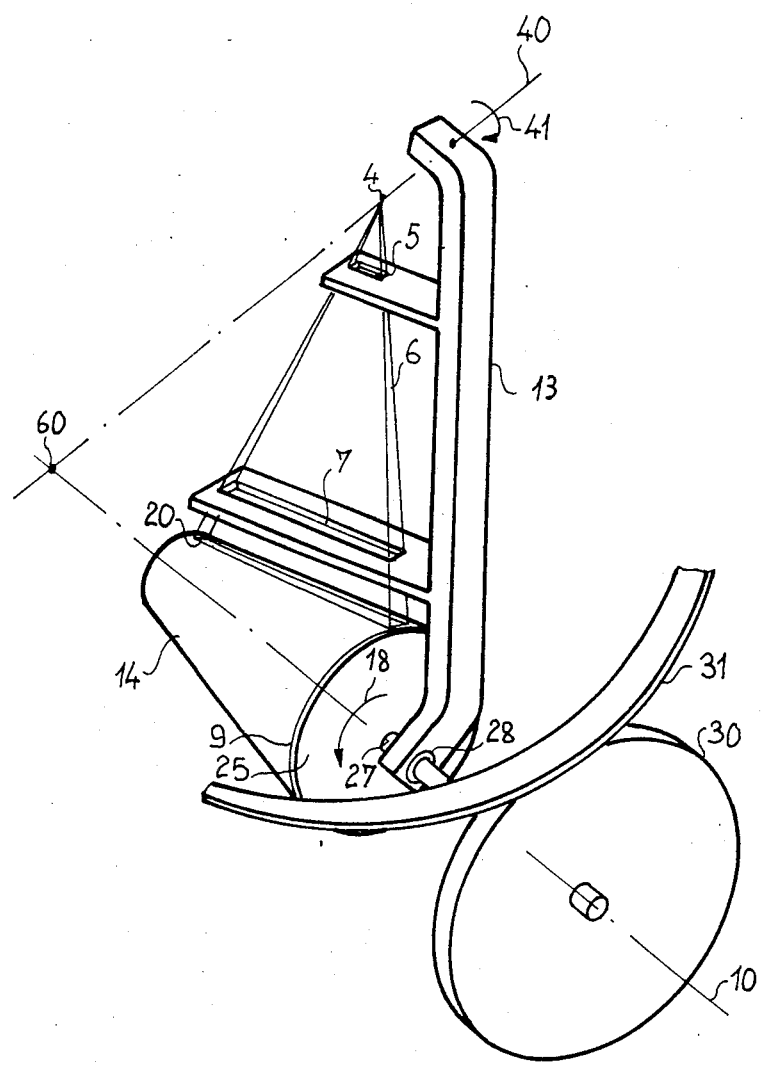

RADIOLOGICAL SCANNING APPARATUS

BACKGROUND OF THE INVENTION

The present invention relates to a radiological scanning apparatus, particularly for radio diagnosis, for forming an image of an object or zone of a patient to be examined on a film, while scanning this object with a flat fan shaped X ray beam.

The apparatus for forming a radiologial image of an object generally include an X ray source, sending a substantially uniform flow of X rays over the whole surface of the object whose image it is desired to form. The X rays pass through the object while undergoing variable attenuation, and produce an image on a receiver sensitive to the X rays.

The receiver may be a film in which the effect of the X rays produces a modification of the material forming its sensitive surface, such as the creation of crystal nuclei, creation of traps, or more generally any transformation giving rise to a local modification of a physical property which may be measured by an appropriate analysis means; such film consisting for example of a photographic plate the darkening of which depends on the X ray dose received at each point, or else a plate of a photostimulable luminescent material, the luminescence of each point being proportional to the X ray dose received.

Another type of receiver may be formed by a two dimensional network of cells sensitive to the X rays, of small size, each cell delivering an electric signal proportional to the X ray dose received.

In conventional radio diagnosis apparatus, the X ray dose received at a point of the receiver corresponds, on the one hand, to the amount of X rays which have not been absorbed by the object over a path in a straight line from the X ray source to the receiver, and, on the other hand to the amount of X rays diffused by all the points of the objects subjected to the X ray radiation. Thus, the receiver records two images:

the first image is formed by the direct rays propagating in a straight line, this image having a resolution which only depends on the dimension of the X ray source;

the second image is formed by the diffused X rays; this image is very fuzzy and considerably reduces the quality of the overall image.

Radiological scanning apparata reduce the influence of the diffused X rays. In these apparata, the X ray source illuminates the object through a collimator or slit which gives to the x rays the form of a flat so called "fan shaped" beam. The beam then passes through a second slit slightly narrower than the projection of the first slit or collimator on the plane of the second slit.

The flat fan shaped beam then exposes a receiver which may be a flat receiver as in the scanless system, or an elongate receiver limited to the projection of the second slit on the plane of this receiver.

In this configuration, the object is disposed between the first and second slits only a fraction of the object is exposed to the X rays. This fraction is in the form of a slice defined by the intersection of the fan shaped beam and the object; thus, a point of the receiver exposed to the direct X rays is only exposed to the diffused X rays by the exposed fraction of the object, which forms a reduction of the diffused X rays all the greater the narrower the first slit, that is to say that the beam is flat.

To expose any object, the fan shaped beam is moved with respect to the object so as to successively expose all the fractions thereof in a scanning movement, the complete image of the object being obtained at the end of such scanning.

The systems which use the scanning technique offer a considerable improvement in the image quality. But up to now, one of the limits in use of this technique is due to the receivers, particularly when it is desired to form simultaneously several images of the same zone of the object to be examined. It may in fact be interesting to obtain two simultaneous images of the object, obtained by two flat fan shaped beams whose sources have for example a different position, so as to obtain different images which provide stereoscopic information; another case may for example be that where the flat fan shaped beams have different energy spectra, the different images of the same object at different energies may then provide additional information about the nature of the tissues or materials forming the object.

Since the fan shaped beams have a relatively small thickness, it is possible in a scanning system to dispose several pairs of slits, so as to form several fan shaped beams which fan the object one after the other. At the present time, the receivers of the film type mentioned above do not lend themselves to such a configuration, particularly because of their size which is too great, considered in the scanning direction and up to now two successive fan shaped beams superimposed their image on a single film.

The problem of the size of the receiver may be settled by using receivers of the type having detection cells, such as already mentioned. The detection cells are then organized so as to form a detection strip whose detection plane, exposed to the beam, has an elongate form in the direction of the plane of the fan shaped beam. The detection strip is moved during scanning, so as to merge permanently with the projection of the second slit mentioned above as being interposed between the object and the receiver.

The disadvantage of this solution resides in the fact that it does not allow an image to be obtained having a definition as good as the image obtained by a film, this definition being related to the size of its cell and to the number thereof.

If the second slit is of a size smaller than the resolution of the desired image, the detection strip may be formed by a single row of detection cells. When the second slit is greater than the desired resolution, the detection strip must be formed of several rows of cells, which involves using a device for transferring the information from one row of cells to the adjacent row of cells, at the moving speed of the detection strip.

This arrangement, while not allowing the quality of the image obtained by a film to be reached, adds to the complexity of the means required for reforming an image from the information delivered by each cell during scanning. It should be noted that these means form large and particularly costly equipment with respect to the means required for using a film.

SUMMARY OF THE INVENTION

The present invention relates to a radiodiagnosis scanning apparatus in which the receiver keeps the advantages of the film, while being more compact than in the prior art, so that it is possible, particularly, to use several receivers in order to form simultaneously several images of an object, each image being carried by a separate receiver or film.

According to the invention, radiological scanning apparatus having an X ray source, a collimator defining a flat fan shaped X ray beam, a film sensitive to the X rays, means for producing a movement of said fan shaped beam with respect to an object to be examined, so as to provide scanning of said object by said beam, is characterized in that said film is formed with a surface of revolution whose axis of revolution is substantially parallel to the plane of said fan shaped beam, said film being on the one hand moved with respect to said object in the same direction and in synchronism with said movement of said fan shaped beam, said film being on the other hand rotated about itself about said axis of revolution, so as to renew an exposure surface exposed by said fan shaped beam during said scanning movement.

BRIEF DESCRIPTION OF THE DRAWINGS

The invention will be better understood from the following description, given by way of non limitative example, with reference to the two accompanying Figures in which:

FIG. 1 shows schematically in a perspective view a radiological apparatus in accordance with the invention; and FIG. 2 shows a perspective view of a second version of the radiological apparatus of the invention.

DETAILED DESCRIPTION OF THE INVENTION

FIG. 1 shows a radiological apparatus 1 of the invention, for obtaining an image (not shown) or simultaneously several radiological images of an object 2. The radiological apparatus 1 includes an X ray emitting tube 3 of conventional type generating, from a source 4, an X ray radiation. The X rays pass through a slit of collimator 5 which confers on it the form of a flat fan shaped beam 6. The fan shaped beam 6 then passes through the object 2 before passing through a slit 7 for then exposing a receiver 8 sensitive to the X rays. The receiver 8 is formed by a film 9 such as explained above, i.e. a film on which the effect of the X rays produces a modification giving rise to a local modification of a physical property which may be measured by appropriate analysis means; the film 9 possibly having the same sensitive surface as a conventional X ray film.

According to a feature of the invention, film 9 is wound on itself so as to form a surface of revolution 14 whose axis of revolution 10 is substantially parallel to the plane 11 of the fan shaped beam 6; with the axis of revolution 10, in the non limitative example described, contained in the same plane as a central plane 12 (shown by a broken line) of the fan shaped beam 6.

The image of the object 2 is formed by scanning this latter by means of the fan shaped beam 6. In the non limitative example of the description, such scanning results in linear movement of the assembly formed by the X ray emitting tube 3, namely the X ray source 4, the collimator 5 and slit 7, in a direction shown by an arrow 16 substantially perpendicular to the plane 11 of the fan shaped beam 6. For this, the X ray device 1 comprises means 13–15 for producing the movement of the fan shaped beam 6. In the non limitative example described, these means are formed by an upright 13 firmly secured to the slit 7, to the collimator 5 and to the X ray tube 3 in a conventional way, the upright 13 being itself firmly secured to a motor driven carriage 15 travelling over rails 17 shown by broken lines.

According to a characteristic of the invention, the film 9 is moved with respect to object 2 in the same movement as that of the scanning movement of the fan shaped beam 6, namely in the same direction 16 and in synchronism therewith; the central plane 11 of the fan shaped beam 6 remaining in this movement substantially centered on the axis of revolution 10.

In accordance with an essential characteristic of the invention, the film, during its movement in direction 16 or scanning movement, is rotated on itself about the axis of revolution 10, in the direction as shown by a second arrow 18 for example.

In this configuration, film 9 is exposed by the fan shaped beam 6 on an exposure surface 20 resulting from the projection of slit 7, and a combination of the movement in direction 16 with rotation in direction 18 results in renewing, by a blank surface of film 9, the exposure surface 20 exposed by the fan shaped beam 6; the main direction of movement of film 9 at the level of the exposure surface 20 being opposite the direction 16 of movement of the fan shaped beam 6, as shown by a third arrow 22.

In the non limitative example of the description, film 9 has the shape of a cylinder and the circumference of a circle 23 on which bears a directrix 24 of this cylinder forms a length of film 9 if this latter had been flat as in the prior art. In the configuration of the invention, film 9 has an image produced thereon by the fan shaped beam 6 as if it had been flat and stationary as in the prior art; but an important advantage of the invention is a considerable reduction of the dimension of film 9 in direction 16, this dimension being reduced in the invention to the diameter D of circle 23 whereas it would in the prior art have been equal to the circumference of circle 23. This reduction in size allows, with the present invention, a second fan shaped beam (not shown) to be formed in a way known per se at the side of the fan shaped beam 6 from, for example, the same means as those used for forming the first fan shaped beam 6; such a construction is described for example in a PCT patent application, published under the publication No. WO 82/01124, which shows an object scanned simultaneously by several fan shaped X ray beams. Under these conditions, a second film 9' (shown by a broken line circle), having the same form as the first film 9, may be disposed parallel thereto so that its axis of revolution 10' is at a distance d from the first axis of revolution 10 slightly greater than the diameter D of circle 23. It is then possible to produce complete scanning of object 2 by the first and by the second fan shaped beams so as to form simultaneously an image of object 2 formed on the first film 9 and another image formed on the second film 9'.

Film 9 may be cylindrical either because so formed during manufacture, or it may be sufficiently flexible to be applied against the surface of a film carrier 25 having, in the non limitative example of FIG. 1, the form of a cylinder. The film carrier 25 is made from a material absorbant to the X rays, so that only the exposure surface 20 is exposed to the fan shaped beam 6. In the non limitative example described, the film carrier 25 includes a shaft 27 disposed along the axis of revolution 10. Shaft 27 being fixed to upright 13 by the bearing means 28 for example, so that movement of upright 13 in direction 16 also causes movement of the film carrier 25 and of the film 9, while allowing these latter to rotate about the axis of resolution 10.

To form on film 9 an image of object 2, in a manner substantially identical to the image obtained with a flat and stationary film, the speed of rotation of film 9 must be related substantially proportionally to the speed of the scanning movement 16 of the fan shaped beam 6. This may be achieved for example by means known per se (not shown) such as a motor for controlling the rotation of the film carrier 25, this motor being itself controlled by a device measuring the speed of the scanning movement 16.

In the non limitative example of the description, rotation of film 9 at a speed proportional to that of the scanning movements 16 is obtained by means of a rolling disk 30 fixed to shaft 27 and rolling in engagement with a rolling surface 31 parallel to the scanning movement 16 and supported by conventional means (not shown). The rolling disk 30 and the rolling surface 31 are disposed at one end 32 of the cylinder formed by the carrier for film 25, so as not to be disposed in the field of the fan shaped beam 6, this end 32 being situated on the same side as upright 13. It should be noted that the same assembly may also be disposed on the same side as a second end 33 opposite the first end 32, but that in some cases as in X ray examination of the breast, it is imperative for this assembly to be disposed on the same side as the first end 32 so that the film 9 may be very close to the thorax.

The rolling disk 30 having an axis of symmetry merging with the axis of revolution 10, and having substantially the same diameter (not shown) as the diameter D of circle 23, its movement in the direction of the scanning movement 16 generates its rotation about the axis of revolution 10 in the direction as shown by the second arrow 18 and thus causes rotation of film 9 at the appropriate speed.

FIG. 2 shows a second version of the invention, in which the film 9 forms a surface of revolution 14 of conical type, film 9 being mounted on the film carrier 25, itself formed as a truncated cone. This allows more particularly an image of object 2 (not shown in FIG. 2) to be formed on the surface of revolution 14 which, developed, forms an arc of a crown; such a configuration being interesting in the case of S ray examination of the breast for example.

As in the preceding example, source 4 emits X rays which pass through the collimator 5 by which it is formed into the fan shaped beam 6, and which then passes through the object 2 then slit 7 so as to expose the film 9 over the exposure surface 20. The collimator 5, the slit 7 and the film carrier 25 being supported by the upright 13, the X ray emitting tube 5 not being shown for the sake of clarity of the Figure.

In the non limitative example of this version of the invention, the scanning movement 16 of object 2 by the fan shaped beam 6 is obtained by leaving the source 4 and object 2 fixed, and by moving the collimator 5, slit 7 and the film carrier 25 in a uniform movement. To this end, upright 13 is rotated as shown by a fourth arrow 41 about an axis of rotation 40 passing through source 4 and through the axis of revolution 10 of the film carrier 25, as shown in FIG. 2; in the example described, the point of intersection 60 of the axis of rotation 40 and of the axis of revolution 10 is the apex of the cone formed by the surface of revolution 14. The combination of this latter rotational movement 41 and of the rotation of film 9 about the axis of revolution 10 in the direction as shown by the second arrow 18 confers on film 9 a movement such that the points of the film in the exposed region, i.e. the exposure surface 20 itself corresponding to the projection of slit 7, may be considered, with an approximation compatible with the desired resolution for the image, as fixed with respect to source 4 and object 2 when the collimator 5 and slit 7 moves; the exposure surface 20 being, in the non limitative example described, substantially parallel to slit 7, because of the orientation conferred on the axis of revolution 10.

The advantage of such a configuration is that the movement 16 for scanning object 2 by the fan shaped beam 6 is performed along an arc of a crown (not shown) which also corresponds to the development of film 9 when it is formed along a truncated cone).

The rotation of film 9 about the axis of revolution 10 must be related to the scanning speed and the correct rotational speed may be obtained by means similar to those of the preceding example, namely under the control of a motor (not shown) or by the truncated cone formed by the film carrier 25 or the rolling disk 30 rolling over a rolling surface.

In the example shown in FIG. 2, the rolling disk 30 is formed as a truncated cone having the same apex 60 as the cone formed by the surface of revolution 14. The rolling disk 30 rolls against the rolling surface 31, which, in this case, is formed by a part of the surface of the cone (not shown) having substantially as apex the apex 60 and whose axis of revolution merges with the axis of rotation 40 about which the upright 13 rotates.

This version of the invention, as well as the preceding example, allows the dimension of the film to be decreased consider in the direction of the scanning movement, and several films to be disposed behind each other, each exposed by a fan shaped beam so as to form several images simultaneously.

It should be noted that another advantage of the invention resides in the fact that the cylindrical or conical shape of the film carrier 25 and of films 9 lends itself to an analysis by systems of the belinograph type.

What is claimed is:

1. A radiodiagnosis scanning apparatus including an X-ray source which emits X-rays, a collimator forming a flat fan shaped X-ray beam from said X-rays, a film sensitive to said X-rays, a slit interposed between an object to be examined and said film in the path of said fan shaped beam, means for producing a movement of said fan shaped beam with respect to said object so as to scan this latter by means of said fan shaped beam, wherein said film is conformed about a surface of revolution whose axis of revolution is substantially parallel to the plane of said fan shaped beam, said firm being on the one hand moved with respect to said object in the same scanning movement and in synchronism with said fan shaped beam, said film being on the other hand moved with respect to said object in the same scanning movement and in synchronism with said fan shaped beam, said film being on the other hand rotated on itself about said axis of revolution, so as to renew, during said scanning movement, an exposure surface exposed by said fan shaped beam, wherein said film is conformed about a cone.

2. The radiodiagnosis apparatus as claimed in claim 1, wherein said film is mounted on a film carrier coupled to said means for producing the scanning movement.

3. The radiodiagnosis apparatus as claimed in claim 2, wherein said film carrier is made from a material absorbing the X rays.

4. The radiodiagnosis apparatus as claimed in claim 1, further comprising means for generating said rotation of said film at a speed substantially proportional to that of the scanning movement.

5. The radiodiagnosis apparatus as claimed in claim 4, wherein said means for generating the rotation of the film include a rolling surface parallel to said scanning movement and a rolling disk firmly secured to said film carrier and rolling against said rolling surface.

6. The radiodiagnosis apparatus as claimed in claims 1 or 2, wherein said means for producing the scanning movement include an upright movable with respect to the object and with respect to the radiation source, said collimator, said slit and said film carrier being fixed to said upright.

7. The radiodiagnosis apparatus as claimed in claim 6, wherein said upright is movable in rotation about an axis passing through said radiation source and intersecting said axis of revolution at a point forming substantially the apex of a cone formed by said film.

8. A radiodiagnosis scanning apparatus comprising:
X-ray source means for emitting X-rays;
a first collimator forming from said X-rays a first fan shaped X-ray beam;
a first film sensitive to the first fan shaped X-ray beam;
a first slit interposed between an object to be examined and said first film in the path of said first fan shaped X-ray beam;
first means for producing a movement of said first fan X-ray shaped beam with respect to said object so as to scan said object by means of said first fan shaped X-ray beam;
wherein said first film is conformed about a surface of revolution having an axis of revolution substantially parallel to the plane of said first fan shaped X-ray beam, said first film being on the one hand moved with respect to said object in the same scanning movement and in synchronism with said first fan shaped X-ray beam, said first film being on the other hand rotated on itself about said axis of revolution so as to renew, during said scanning movement, an exposure surface exposed by said first fan shaped X-ray beam;
said apparatus further comprising:
a second collimator forming from said X-rays a second flat fan shaped x-ray beam;
a second film sensitive to the second fan shaped X-ray beam;
a second slit interposed between said object to be examined and said second film in the path of said second fan shaped X-ray beam;
second means for producing a movement of said second fan shaped X-ray beam with respect to said object so as to scan said object by means of said second fan shaped X-ray beam;
wherein said second film is conformed about a second surface of revolution having a second axis of revolution which is substantially parallel to the plane of said second fan shaped X-ray beam and substantially parallel to the plane of said first fan shaped X-ray beam, said second film being on the one hand moved with respect to said object in the same scanning movement and in synchronism with said second fan shaped X-ray beam, said second film being on the other hand rotated on itself about said second axis of revolution, so as to renew, during said scanning movement, an exposure surface exposed by said second second fan shaped X-ray beam.

* * * * *